No. 740,396. PATENTED OCT. 6, 1903.
L. S. CHADWICK.
COMBINED VEHICLE DOOR AND SEAT.
APPLICATION FILED FEB. 11, 1903.
NO MODEL.

WITNESSES:
M. M. Hamilton
G. J. Hutton

INVENTOR
Lee S. Chadwick
BY
Harding & Harding
ATTORNEYS.

No. 740,396. Patented October 6, 1903.

UNITED STATES PATENT OFFICE.

LEE S. CHADWICK, OF RIDLEY PARK, PENNSYLVANIA.

COMBINED VEHICLE DOOR AND SEAT.

SPECIFICATION forming part of Letters Patent No. 740,396, dated October 6, 1903.

Application filed February 11, 1903. Serial No. 142,863. (No model.)

*To all whom it may concern:*

Be it known that I, LEE S. CHADWICK, a citizen of the United States, residing at Ridley Park, county of Delaware, and State of Pennsylvania, have invented a new and useful Improvement in a Combined Vehicle Door and Seat, of which the following is a full, clear, and exact description, reference being had to the accompanying drawings, which form a part of this specification.

The object of my invention is to provide means whereby if necessary to comfortably accommodate the occupants of a carriage an additional seat may be provided immediately in front of the door and whereby if the seating capacity is sufficient without said additional seat the same may be quickly and readily folded out of the way and concealed, so that the interior will present the appearance of an ordinary carriage.

The invention has been applied and is particularly intended for application to a motor-vehicle or automobile, althought it may be found applicable to other classes of vehicles.

Figure 1:
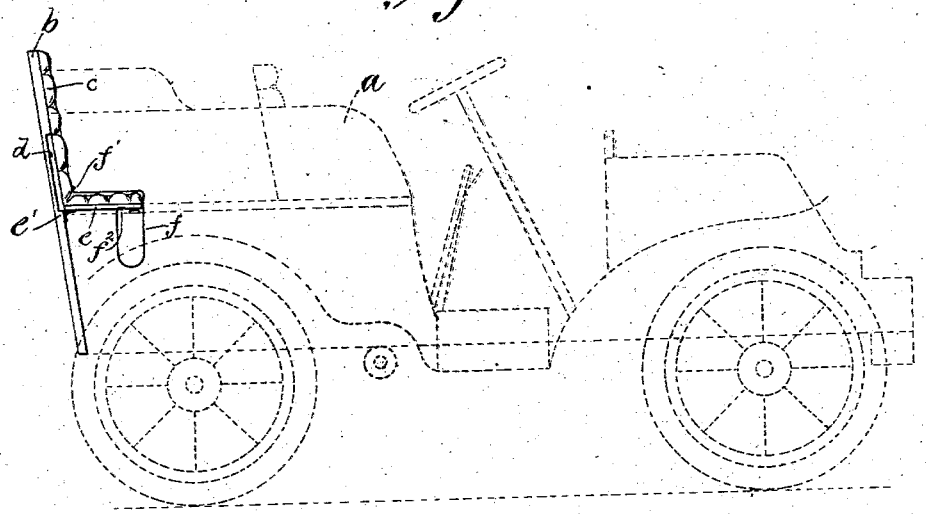
Figure 2:
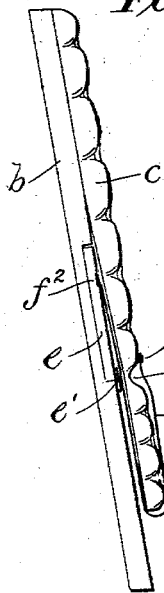
Figure 3:
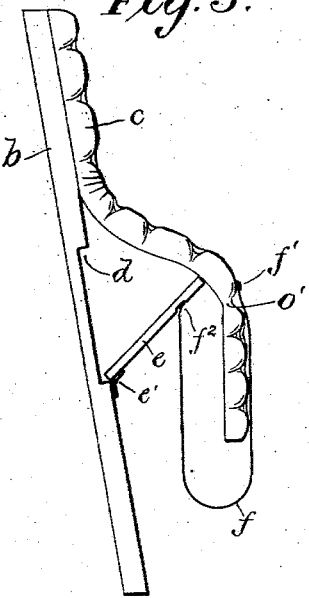
Figure 4:
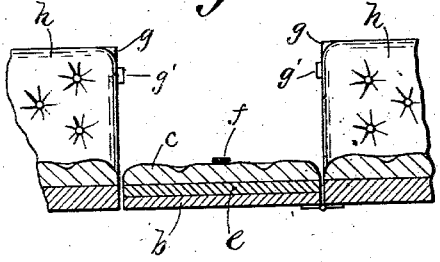

In the drawings, Figure 1 is a side view, the dotted lines representing the outlines of an ordinary motor-vehicle and the full lines representing the parts embodying my invention, the seat being shown in its extended and operative position. Fig. 2 is a side view of the door and folding seat, the latter being in its normal concealed position. Fig. 3 is a side view of the same parts in one of the transitory positions during the swinging of the seat into its extended and operative position. Fig. 4 is a plan view of Fig. 2 and of the fixed seats on either side of the space occupied by the folding seat when the latter is in its operative position.

In the larger-sized motor-vehicles containing front and rear seats it is usual to provide access to the rear seats by means of a swinging door located centrally at the rear of the vehicle. The rear seats therefore do not extend the full width of the carriage, but a space is necessarily left in front of the swinging door to permit ingress and egress of the occupants. This space, separating the two rear seats, is sufficient to accommodate an additional person. In my invention I arrange to have the door itself sustain this seat in a normally concealed position, so that the seat may be utilized or not, as desired, when the door is closed.

$a$ represents the vehicle.

$b$ is the swinging rear door. This door, like the whole interior of the vehicle, is upholstered on its inner face by means of the cushion $c$.

$d$ is a recess in the inner face of the door.

$e$ is a seat hinged to the door at $e'$ and of a thickness and area equal to the depth and area of recess $d$, so that the seat when swung upwardly and backwardly will enter the recess and its under face lie flush with the inner face of the door, as shown in Fig. 2.

$f$ is a strap secured at one end to the cushion $c$ by means of the button $f'$ and extending downwardly in front of the cushion, under and around, and upwardly back of the cushion and secured at the other end to the lower face of the seat at $f^2$. The positions of the seat, cushion, and strap in Fig. 2 represent the normal positions of these parts, and the seat is then entirely concealed, while the inner face of the door presents a normal appearance.

When it is desired to bring the seat into its operative position, the cushion is lifted and the seat swung down, as shown in Fig. 3, into the substantially horizontal position shown in Fig. 1. The cushion $c$ is loosely padded at $o'$, so that it may fold on this line and its lower end overlie the seat.

To support the seat in its extended position, I have provided lugs $g'$ on strips $g$, secured to the inner upper corners of the fixed seats $h\ h$ on either side of the door, the seat resting on the lugs when in its extended position.

Having now fully described my invention, what I claim, and desire to protect by Letters Patent, is—

1. In a vehicle, the combination, with the door, of a seat movably secured thereto so as to either fold against, or extend in front of, said door, and a cushion adapted to overlie the bottom of the seat when the latter is in its folded position and overlie the upper face of the seat when the latter is in its extended position, substantially as described.

2. In a vehicle, the combination, with the door, of a seat movably secured thereto so as to either fold against, or extend in front of, said door, and a cushion adapted to overlie the bottom of the seat when the latter is in its folded position and overlie the upper face of the seat when the latter is in its extended position, and a strap extending in front and back of the cushion and embracing its lower end and secured at one end to the cushion and at the other end to the seat, substantially as described.

3. In a vehicle, the combination, with the door, of a seat hinged thereto at its lower end and thus adapted to fold backwardly against, and forwardly at an angle to, said door, a cushion secured to said door above the free end of the seat when the latter is in its folded position and extending down below the hinged end of the seat, whereby the cushion may be moved forwardly to permit the seat to be swung into its extended position and whereby the cushion is adapted to overlie the seat when so extended, substantially as described.

4. In a vehicle, the combination, with the door, of a seat hinged thereto at its lower end and thus adapted to fold backwardly against, and forwardly at an angle to, said door, a cushion secured to said door above the free end of the seat when the latter is in its folded position and extending down below the hinged end of the seat, whereby the cushion may be moved forwardly to permit the seat to be swung into its extended position and whereby the cushion is adapted to overlie the seat when so extended, and a strap extending in front and back of the cushion and embracing its lower end and secured at one end to the cushion and at the other end to the seat, substantially as described.

5. In a vehicle, the combination, with the door provided with a recess, of a seat of substantially the same thickness and area as the depth and area of said recess, said seat being hinged at its lower end to said door at the lower edge of the recess, whereby said seat is adapted to fold backwardly within the recess and substantially flush with the face of the door, and forwardly at an angle to the door, and a cushion adapted to overlie the bottom of the seat when the latter is in its folded position and overlie the upper face of the seat when the latter is swung outwardly, substantially as described.

6. In a vehicle, the combination, with the door provided with a recess, of a seat of substantially the same thickness and area as the depth and area of said recess, said seat being hinged at its lower end to said door at the lower edge of the recess, whereby said seat is adapted to fold backwardly within the recess and substantially flush with the face of the door, and forwardly at an angle to the door, a cushion secured to said door above the free end of the seat when the latter is in its folded position and extending down below the hinged end of the seat, said cushion being loosely padded on a line substantially opposite the hinged end of the seat, and a strap extending in front of and back of the cushion and embracing its lower end and secured at one end to the cushion and at the other end to the seat, substantially as described.

7. In a vehicle, the combination, with the body of the vehicle, the door, and the fixed seats in front of and on either side of said door, of a seat movably secured to said door so as to fold either against, or extend in front of, said door, a cushion adapted to overlie the bottom of the seat when the latter is in its folded position and overlie the upper face of the seat when the latter is in its extended position, and supporting means adapted to support the movable seat in its extended position.

8. In a vehicle, the combination, with the door provided with a recess, of a seat of substantially the same thickness and area as the depth and area of said recess, said seat being hinged at its lower end to said door at the lower edge of the recess, whereby said seat is adapted to fold backwardly within the recess and substantially flush with the face of the door, and forwardly at an angle to the door, a cushion secured to said door above the free end of the seat when the latter is in its folded position and extending down below the hinged end of the seat, said cushion being foldable on a line substantially opposite the hinged end of the seat, and a strap extending in front of and back of the cushion and embracing its lower end and secured at one end to the cushion and at the other end to the seat, fixed seats in front of and on either side of said door, and lugs on said fixed seats adapted to support the movable seat in its extended position.

9. The combination, with a portion of the vehicle-body, of a seat hinged thereto, a cushion fastened thereto at its upper portion and loosely overlying the hinged seat, and a strap secured at one end to the front of the cushion and at the other end to the bottom of the seat and extending around the lower end of the cushion.

10. The combination, with a portion of the vehicle-body provided with a recess, of a seat hinged to the vehicle-body at one edge of the recess and adapted to fold into said recess, and a cushion adapted to overlie the bottom of the seat when the latter is swung into the recess and to overlie the upper face of the seat when the latter is swung outwardly at an angle to its support.

In testimony of which invention I have hereunto set my hand, at Chester, Pennsylvania, on this 6th day of February, 1903.

LEE S. CHADWICK.

Witnesses:
T. CARROLL MIRKIL,
M. M. HAMILTON.